United States Patent [19]
Saar

[11] Patent Number: 5,838,258
[45] Date of Patent: Nov. 17, 1998

[54] SYSTEM FOR MONITORING THE USE OF HEAT ENERGY IN WATER DEVICES IN AN INDIVIDUAL UNIT OF A MULTI-UNIT BUILDING

[76] Inventor: David A. Saar, 8 Bennington Dr., Lawrenceville, N.J. 08648

[21] Appl. No.: 745,300

[22] Filed: Nov. 8, 1996

[51] Int. Cl.[6] .................................................. G08C 19/04
[52] U.S. Cl. .............................. 340/870.11; 340/870.02; 340/870.05; 340/870.17; 364/510; 73/195; 137/552
[58] Field of Search ...................................... 364/509, 510; 73/195, 196, 197, 198; 137/552; 340/870.02, 870.03, 870.05, 870.06, 870.11, 870.17, 603, 604, 606; 705/400, 412, 413

[56] References Cited

U.S. PATENT DOCUMENTS

| | | |
|---|---|---|
| 3,747,082 | 7/1973 | Ottenstein . |
| 4,002,890 | 1/1977 | Welin .................................... 235/151.3 |
| 4,304,127 | 12/1981 | Feller ..................................... 73/193 R |
| 4,306,293 | 12/1981 | Marathe .................................. 364/557 |
| 4,363,441 | 12/1982 | Feinberg .................................. 236/36 |
| 4,558,958 | 12/1985 | Pena ........................................ 374/39 |
| 4,577,977 | 3/1986 | Pejsa ...................................... 374/39 |
| 4,924,404 | 5/1990 | Reinke, Jr. ............................. 364/550 |
| 4,940,976 | 7/1990 | Gastouniotis et al. . |
| 5,035,146 | 7/1991 | Chien ........................................ 73/195 |
| 5,040,415 | 8/1991 | Barkhoudarian .......................... 73/198 |
| 5,053,766 | 10/1991 | Ruiz-del-Portal et al. . |
| 5,079,715 | 1/1992 | Venkataraman et al. . |
| 5,111,407 | 5/1992 | Galpern . |
| 5,153,837 | 10/1992 | Shaffer ............................... 364/464.04 |
| 5,161,563 | 11/1992 | Thompson .............................. 137/486 |
| 5,283,572 | 2/1994 | McClelland et al. . |
| 5,381,136 | 1/1995 | Powers ..................................... 340/539 |
| 5,404,136 | 4/1995 | Marsden . |
| 5,441,070 | 8/1995 | Thompson .............................. 137/552 |
| 5,448,230 | 9/1995 | Schanker ........................... 340/870.03 |
| 5,502,652 | 3/1996 | Hoggatt et al. ......................... 705/412 |
| 5,553,094 | 9/1996 | Johnson ................................. 375/200 |
| 5,565,862 | 10/1996 | Hubbard et al. . |
| 5,646,858 | 7/1997 | Schrock ............................. 364/464.22 |
| 5,721,383 | 2/1998 | Franklin ............................... 73/861.77 |

OTHER PUBLICATIONS

Picoflux Volltrocken Läufer Modulartechnik dated 1992.

*Primary Examiner*—Michael Horabik
*Assistant Examiner*—Timothy Edwards, Jr.
*Attorney, Agent, or Firm*—Spencer T. Smith

[57] ABSTRACT

A system for monitoring the use of heat energy in water devices in an individual unit of a multi-unit complex wherein the multi-unit building is supplied water from a common source and the individual unit has a plurality of energy consuming water devices each supplied by supply and return water pipes supplied from said common source. The system comprises a monitor for monitoring the flow through each of the water pipes which will determine that successive volumetric flow units have flowed through the pipe, define the heat energy of each of the successive volumetric flow units, and compute a total heat energy removed from the successive volumetric flow units, and periodically transmits the total heat energy consumed from the successive volumetric flow units, and a remote receiver which receives the total heat energy transmitted from each of the plurality of monitors and computes a total heat energy use for the individual unit for a selected period of time.

10 Claims, 13 Drawing Sheets

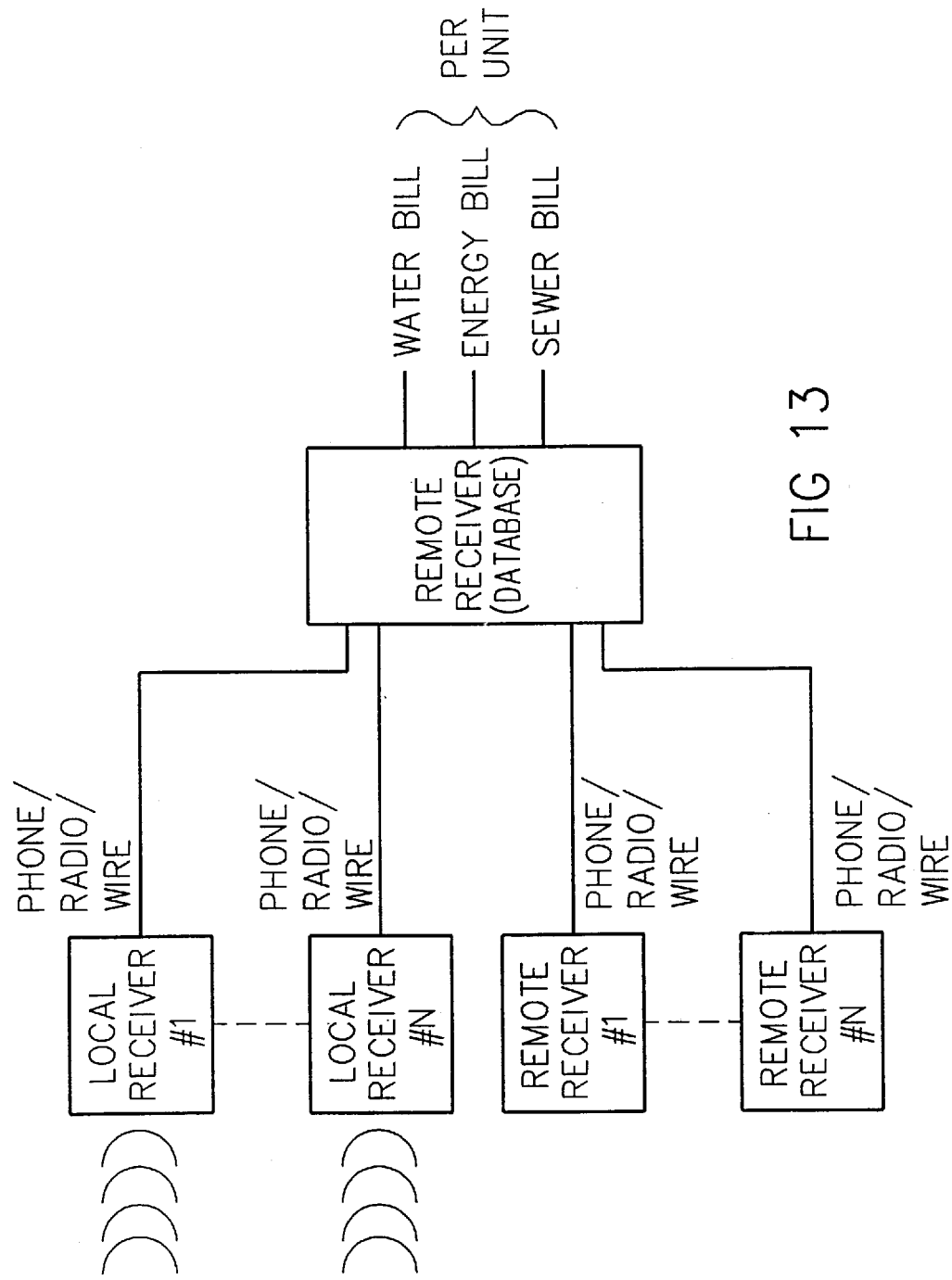

SYSTEM FOR MONITORING THE USE OF HEAT ENERGY IN WATER DEVICES IN AN INDIVIDUAL UNIT OF A MULTI-UNIT BUILDING

BACKGROUND OF THE INVENTION

The present invention relates to a system for monitoring the water consumption and energy use of water consuming devices and monitoring the energy use of water operated heating and cooling devices in multi-unit building complexes where the individual units are supplied water from a common source and more particularly to a system which will calculate the water consumption and water related energy use of the individual units so that water, sewer and energy costs can be fairly apportioned to the units to encourage conservation. The invention also relates to monitoring unusual water usage to detect leaks and open valves.

SUMMARY AND OBJECTS OF THE INVENTION

The individual units of a multi-unit building such as an apartment building are supplied water from a common source (the outlet of the building water meter). The water inlet is split into hot and cold water lines with the hot water line passing through a heater (typically there are separate hot water and heating boilers) which heat the water to the required temperature. In conventional construction, multiple vertical risers supply stacked bathrooms, kitchens and heating/cooling devices. As a result the water supplied to an individual unit can not be metered without substantial, very costly, plumbing infrastructure changes.

It is an object of the present invention to measure the water consumption and the water heat energy use in an individual unit in a multi-unit building so that the individual unit can be assigned responsibility therefor without substantial plumbing infrastructure changes.

It is another object of the present invention to monitor the condition of a water consuming structure so that leaks can be serviced and erroneously open lines can be closed.

Other objects and advantages of the present invention will become apparent from the following portion of this specification and from the accompanying drawings which illustrate in accordance with the mandate of the patent statutes a presently preferred embodiment incorporating the teachings of the present invention.

BRIEF DESCRIPTION OF THE DRAWINGS

Referring to the drawings:

FIG. 13 is a schematic illustration of a system having a plurality of local and remote receivers which are linked to a data base.

DESCRIPTION OF THE PREFERRED EMBODIMENT

Utility provided water 10 (FIG. 1) generally is metered by a water meter WM 11 as it enters a building such as an apartment house or office building. A portion of the water branches off to supply the building cold water supply line 12 and the other portion is supplied to a hot water heater H 13 which supplies the hot water supply line 14 of the building. The building has a number of similar units (in a two story apartment house, there could be four one bedroom apartments, two on each floor, for example) each having a sink (including associated tub/shower) and toilet in the powder room and a second sink (including any associated appliances such as a dishwasher) in the kitchen. Each sink is supplied by separate hot and cold water lines (the hot and cold water lines of the kitchen sink may also supply a dishwasher) and each toilet is supplied by a single cold water line. Stacked kitchens and bathrooms are supplied via vertical risers 15. In each water line (or just downstream in the mixed water line) is located a monitor M 19. FIG. 2 shows the heating/cooling system for the same units. Water (hot in the winter or cold in the summer) is supplied by a suitable source such as a heat pump HP 13A (discrete sources such as a boiler for hot water and a chiller for cold water could be utilized) to a feed line 16 which supplies the individual heating or cooling units H/C 23 through multiple vertical risers 17. The water is returned to the source HP by suitable return lines 18. Located upstream and downstream of each heating or cooling unit H/C is a monitor M.

Figure 3:
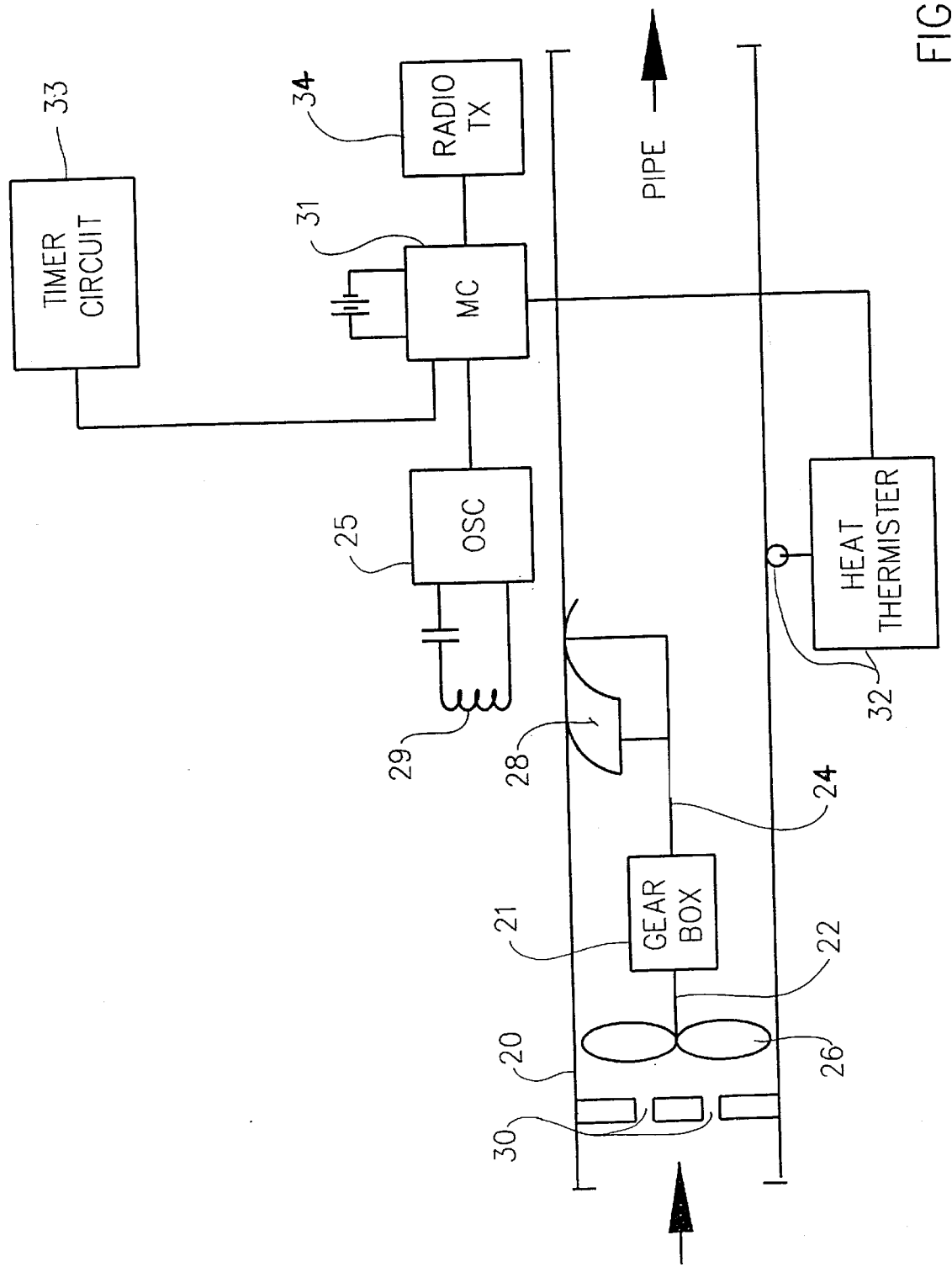
FIG. 3 is a schematic illustration of a monitor shown in FIGS. 1–2.
Figure 4:
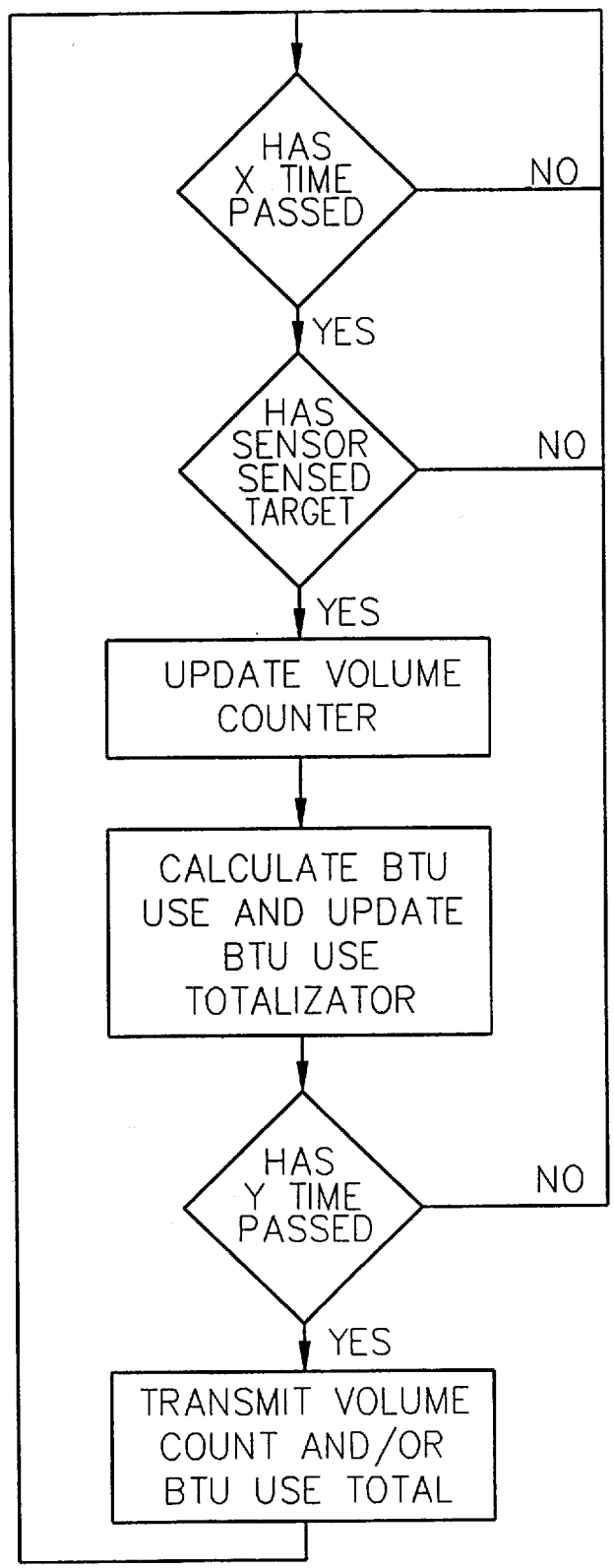
FIG. 4 is a logic diagram for the volume/temperature functions of a monitor.

A monitor M (FIG. 3) which can be located in each line by a plumber, is a unitary battery operated structure, which is fully sealed to reduce tampering and water damage. The monitor can have a universal set of fittings to simplify installation. A monitor may include a pipe 20 in which may be permanently secured a gearbox 21 such as the type found in lawn sprinkler heads to control the movement of the water spray. The gear box has axial input 22 and output 24 shafts which are connected to a turbine wheel drive propeller 26 and a copper or other metal axially extending partial cylindrical portion paddle wheel 28. Water entering the pipe, passes through a set of orifices 30 which direct the water at the propeller blades thereby efficiently driving the gearbox. The gear ratio of the gearbox is selected so that the partial cylindrical portion 28 will make no more than about half a rotation during a sampling time (a rate of rotation that will assure that an oscillator (OSC-25 will sense the presence of the partial cylindrical portion (the target) 28 twice each revolution). The gear ratio may be different for different devices (full flow for a toilet is very different than full flow for a tub, for example). Coil 29 will change inductance twice each revolution changing the frequency of the oscillator. The microprocessor uc 31 or custom specialized electronic circuit can therefore count a pulse each time the target 28 is located at 0° and 180° and each pulse equates to a unit volume of liquid. Referring to FIG. 4, if a reading is to be taken approximately once per "X" time (a minute, for example) based on a timer circuit 33 associated with the microprocessor (see FIG. 3), the gear ratio will be selected so that the target will rotate less than 180°, during one minute with maximum flow through the pipe. Alternately, other sensors could be used such as a rotating magnet and Hall effect sensor, reed switch, capacitive sensor, optical sensor, inductive sensor with ferrite rotator, etc. When, during that time interval, the target has been sensed, a volume counter will be updated to a new total of volume units and at some other regular time interval "y" (once a day, for example), the total volume count will be transmitted by the radio transmitter 34. The updated count is representative of the total volumetric flow through the pipe. Limiting the rate of rotation of the target with the gear box so that a reading need only be taken once per minute, prolongs battery life since the microprocessor uc only has to be turned on once per minute. The flow measuring system could also be an ultrasonic Doppler flowmeter, a magnetic flowmeter, an electronic mass flowmeter, or a vortex flowmeter, for example.

The energy use of the hot water used in a water using device may be computed by multiplying the volumetric volume of the associated hot water pipe by the temperature that hot water is supplied where the monitor is receiving hot water from the hot water heater. Optionally, the monitor can include a heat thermistor 32 (or a thermocouple, etc.) attached to the pipe to sense the temperature of the fluid flowing through the monitor. The microprocessor uc 31 may multiply the temperature by that unit volumetric flow to define a heat content number (BTU use FIG. 4) and will then update the total heat content totalizator. By subtracting the total heat count at one side of a heating/cooling unit H/C from the simultaneous total heat count at the other side (the subtraction made by a local receiver which receives the data from both monitors—FIG. 7, for example), the energy use of the heating/cooling unit can be determined. Alternately, one of the monitors on either side of a heating/cooling unit can monitor only temperature and be connected to the other monitor with that monitor making both computations such as by subtracting out the temperature reading from the other to compute the heat change. Should electrical power be available or should the battery economics permit, the position of the target could be sampled continuously and the gear box would not be required.

Once every day (or some other time interval) which equates to "Y" time interval, the microprocessor will operate the transmitter (which is a radio transmitter 33 in the preferred embodiment but could be an ultra sonic or infrared transmitter, etc.) to transmit the then current count of the register which is representative of volumetric flow, the then current total of the heat content totalizator, identifier data which identifies the apartment unit, the water using device, etc. and any pulse count data used to chronologically locate the transmission. The total of the each heat content totalizator for each monitor in an individual unit may be transmitted to a local receiver and then retransmitted by the local receiver to the host computer which will compute the heat energy use for the individual unit.

Figure 5:
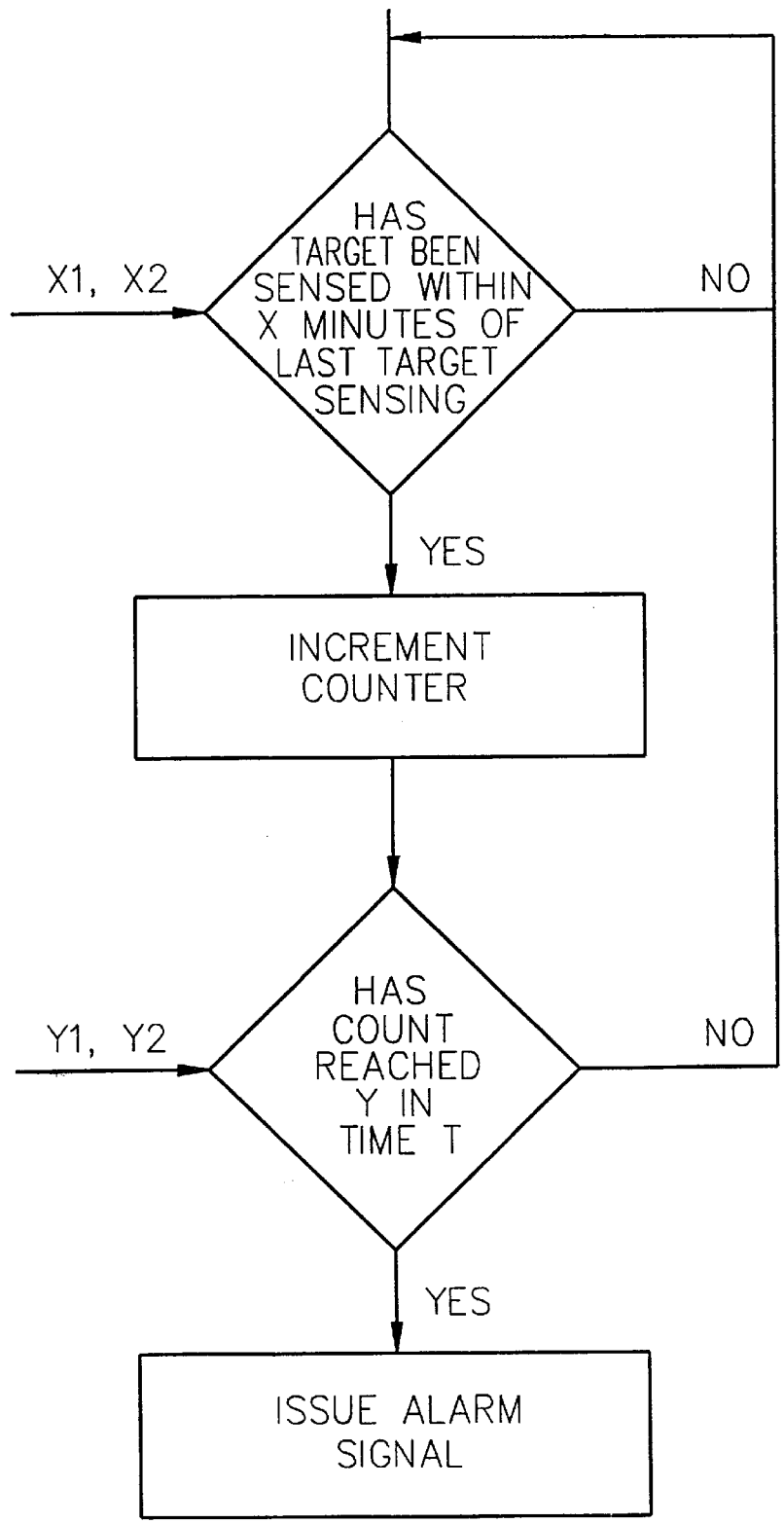
FIG. 5 is a logic diagram for a monitor which will issue an alarm signal when the water using device is continuously open.

The microprocessor uc can also determine that a water consuming device has been left open (a tub running continuously, for example). For example, the microprocessor should detect the presence of the target once a minute while the tub is being filled at the fully open condition. Even at a slow fill rate the target should be sensed once every "X" minutes (FIG. 5). If "X" is five minutes, for example, the filling process should be complete within twenty minutes (four multiples of "X"). Accordingly, according to the algorithm expressed in FIG. 5, when the water has been running for "X" minutes and the target has been sensed, the counter is incremented and the process is repeated. When the target has been sensed in the next "X" minutes the counter again increments and so forth. If the count reaches 15 ("Y"), for example, the water has run for a time beyond that which was required to fill the tub and this can mean that someone has failed to turn the water off, etc. Should the microprocessor determine that flow has continued for more "Y" increments of "X", the microprocessor will direct the transmitter to transmit an alarm signal, identifying the water consuming device, to the receiver which indicates that the device has been left open so that immediate action can be taken to correct the problem. The alarm signal can be transmitted to a local receiver which could be a general alarm system for the home which would announce the condition or it could be further transmitted to a remote receiver which could be at a home security company which could take appropriate action or it could be a part of the water usage system for a multiple unit building as described herein. This algorithm can also be computed with a number of "X" and "Y" values ("X1" and "Y1", "X2" and "Y2", for example) since the fill rate can be chosen at widely different rates. These variables can also be defined during installation by programming non volatile memory in the monitor.

Figure 1:
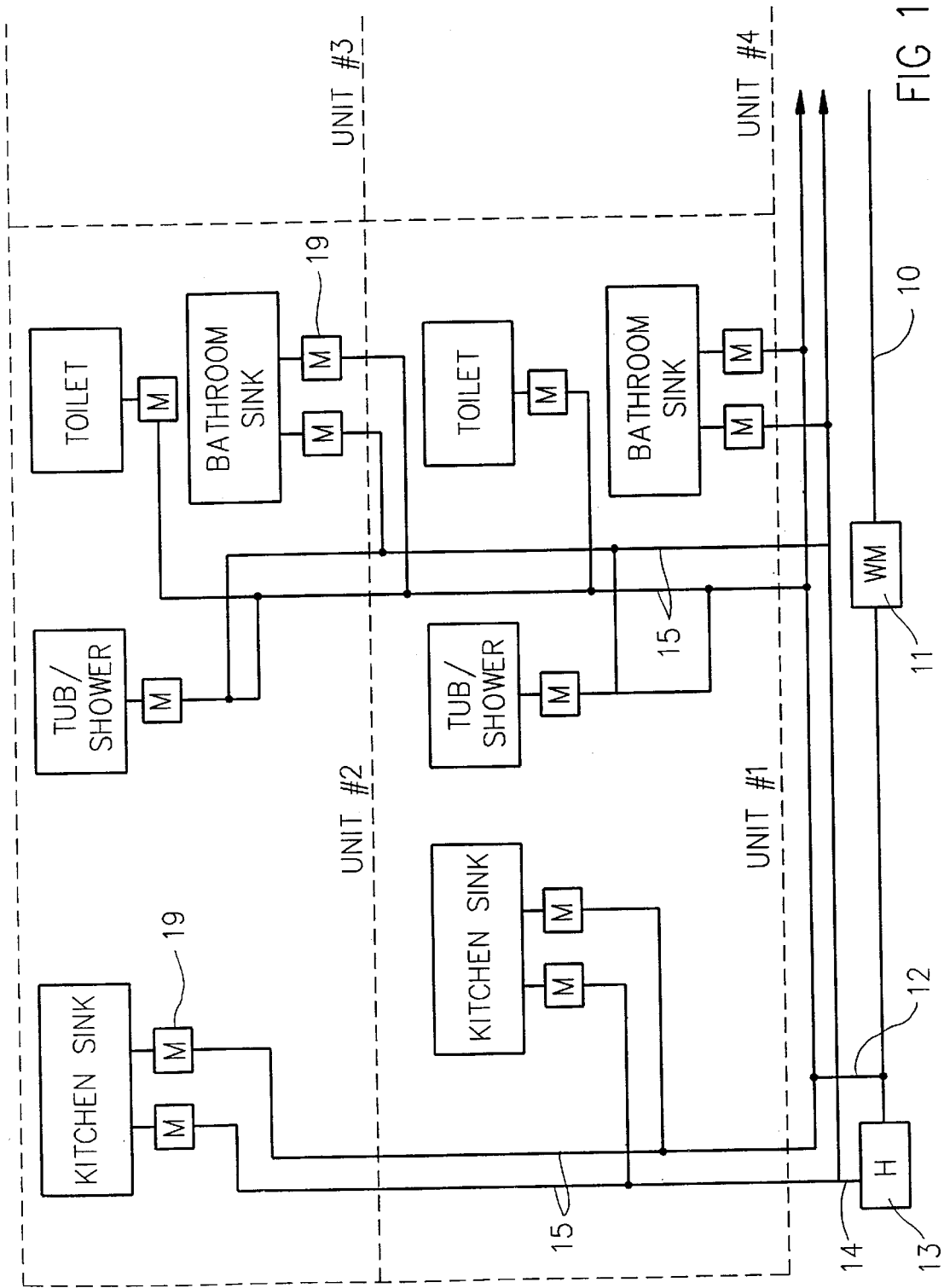
FIG. 1 is a schematic illustration of the water consuming devices of a four unit apartment building wherein each unit has a bathroom with a sink (including any associated tub/shower) and a toilet and a kitchen with a sink (including associated appliances such as a dishwasher) and wherein each pipe supplying the water consuming devices includes a monitor made in accordance with the teachings of the present invention.
Figure 2:
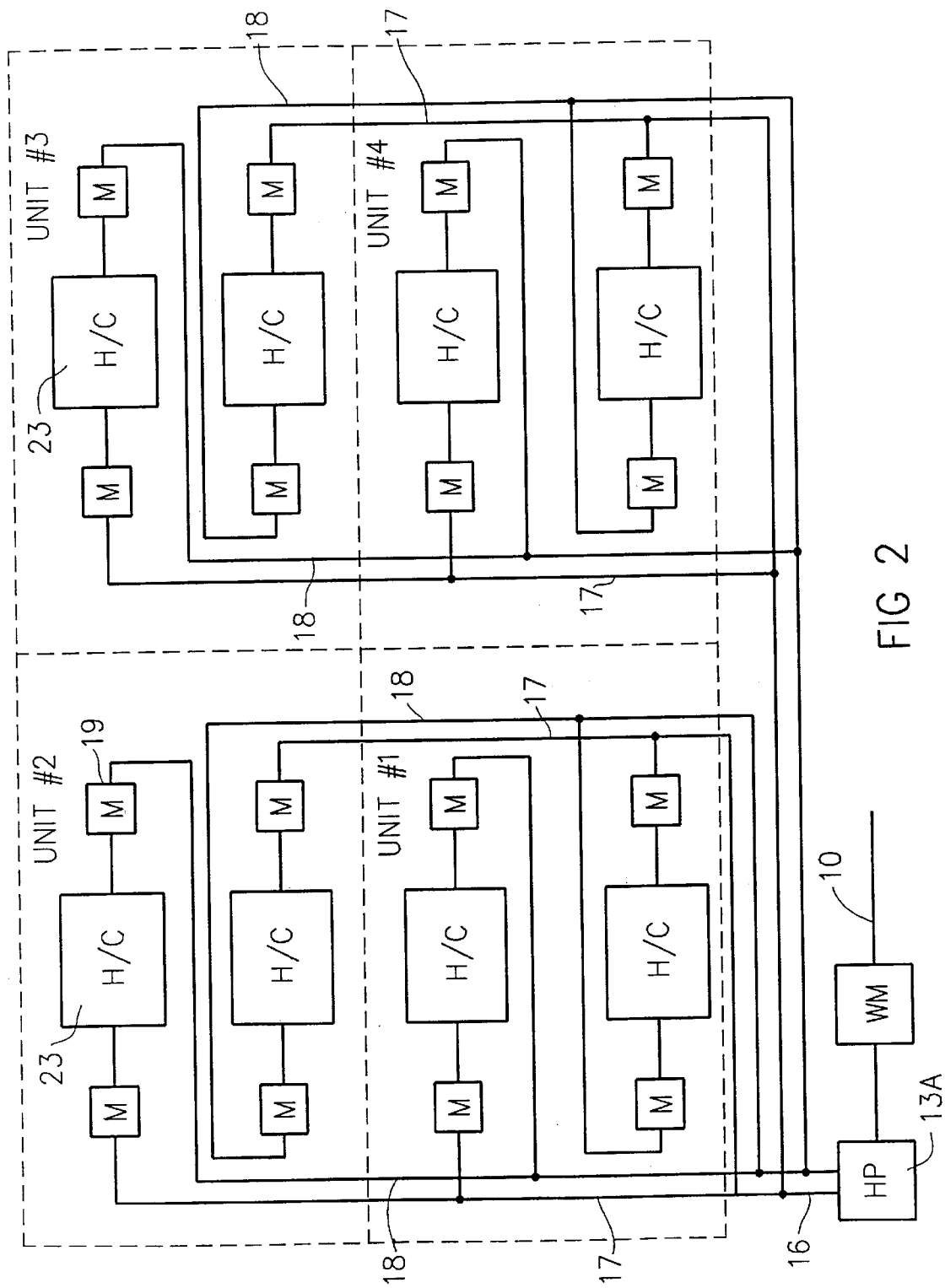
FIG. 2 is a schematic illustration of the heating/cooling system for the same apartment building wherein each apartment has one or more heating/cooling devices each having upstream and downstream monitors, one monitoring temperature and volumetric flow and the other monitoring temperature.
Figure 6:
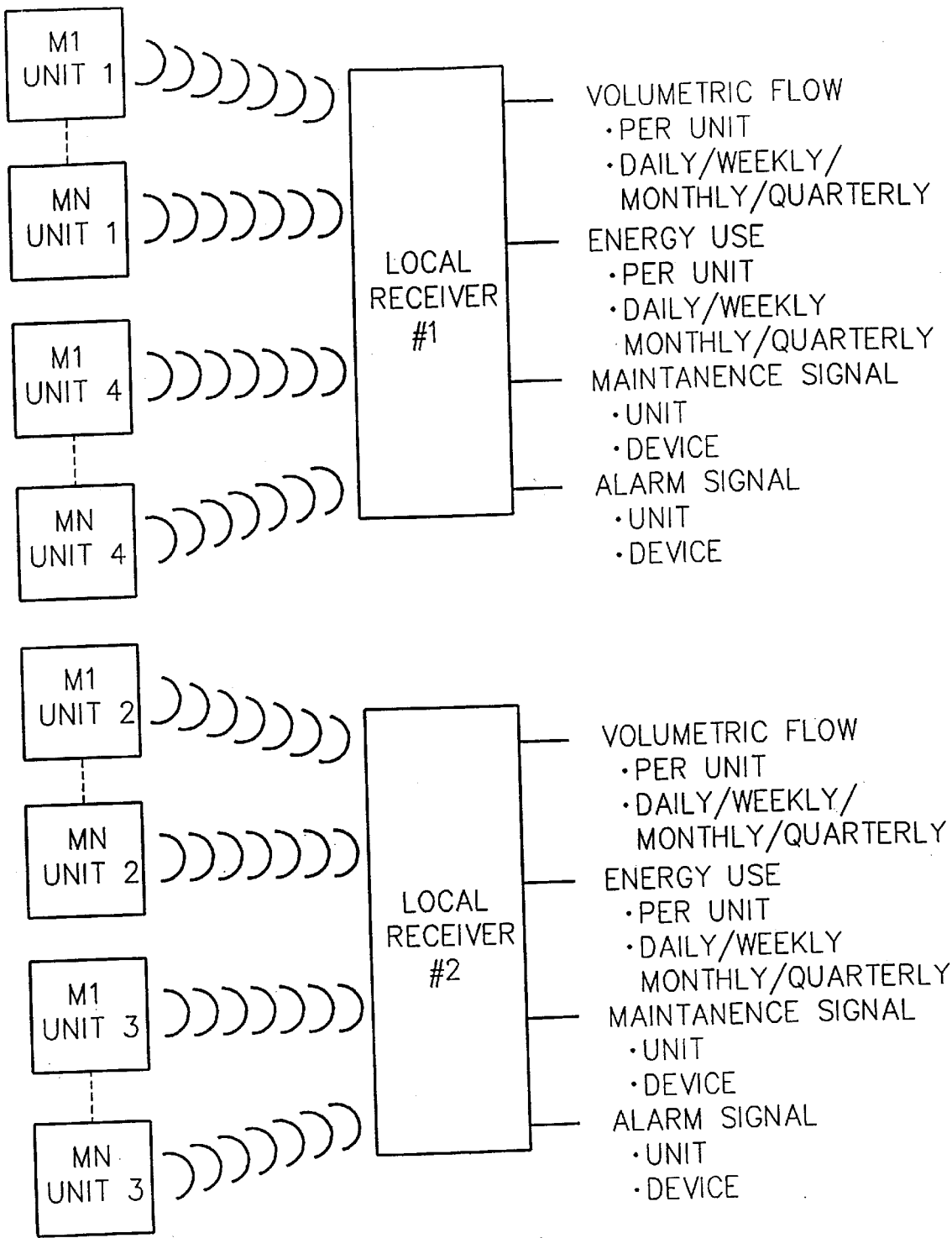
FIG. 6 is a schematic illustration of a system for a multi story building including a receiver on each floor for receiving and outputting data from the monitors on its floor.

In the apartment illustrated in FIGS. 1 and 2, a radio (local) receiver (a microprocessor, for example) which can receive and decode the transmitted radio signal can be located on each floor (FIG. 6) for receiving the data transmitted from all of the monitors on its floor. As shown in FIG. 6, the local receiver may compute daily, weekly, monthly, quarterly, etc., totals for the volumetric flow and energy (BTU) use for each unit, and can issue alarm signals (by audible alarm or telephone to a security location, for example, identifying the unit and the water consuming device subject to the alarm signal. Each receiver could, for example, have a visual readout or it could be connectable to a hand held terminal which can read out the data. By transmitting volumetric flow data from the monitors to the receiver each day, the receiver can determine that a monitor is not operating which could indicate that the monitor battery has died, etc., or that the monitor has been tampered with.

Figure 7:
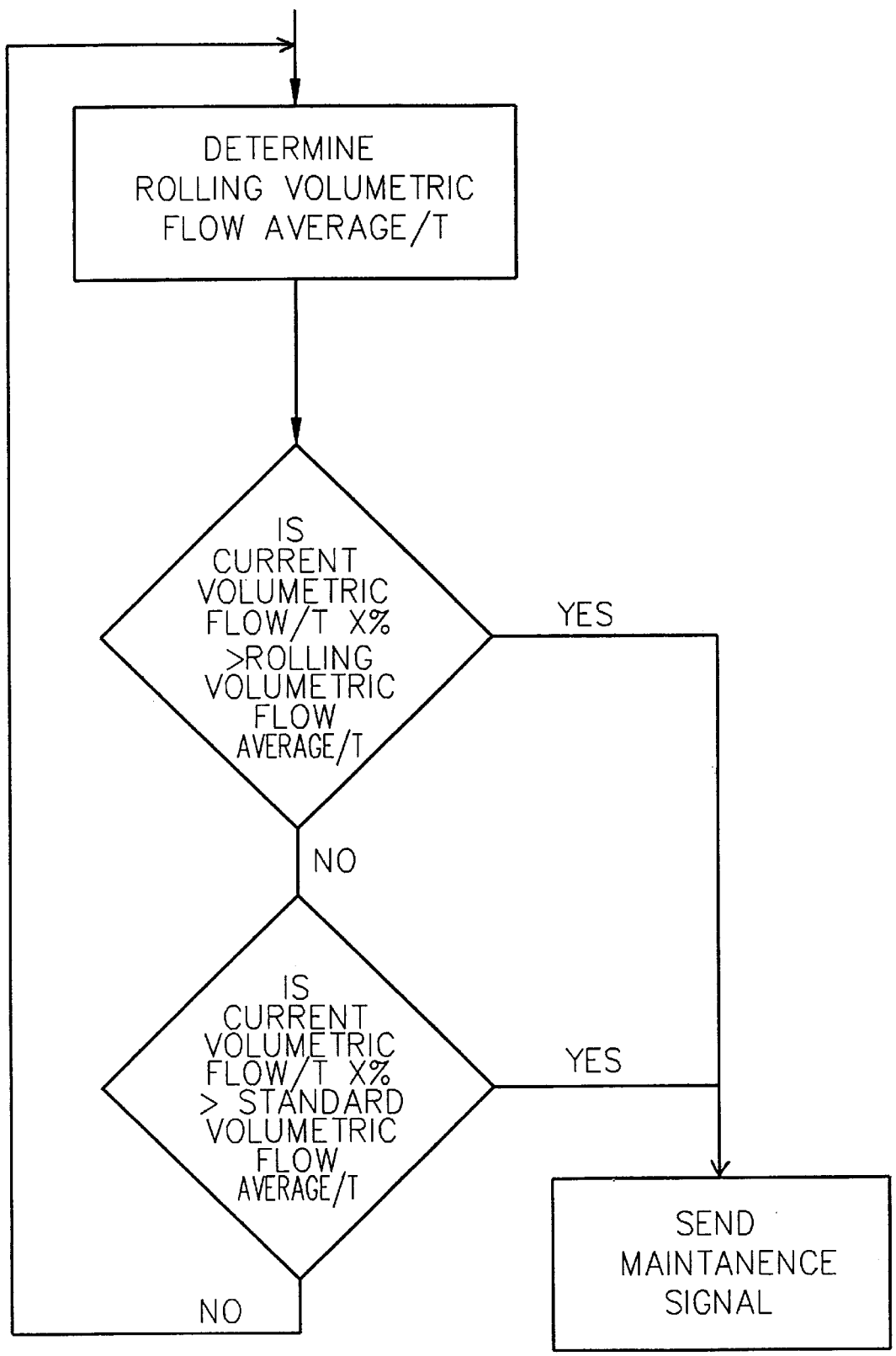
FIG. 7 is a logic diagram for a monitor which will issue a maintenance signal when a water device is leaking.

The local receiver may also implement the algorithm disclosed in FIG. 7. It can determine a rolling volumetric flow average/unit of time ("T" may be 30 or 60 days for example) and first compare that with the calculated current volumetric flow/unit of time. Where it exceeds the rolling average by X% which indicates the a faucet is leaking, for example, the local receiver will send a maintenance signal. A second comparison can also be made to determine whether the current volumetric flow/unit of time exceeds by Y% a standard for that device. Should the difference exceed this variance, the local receiver will issue a maintenance signal.

Figure 8:
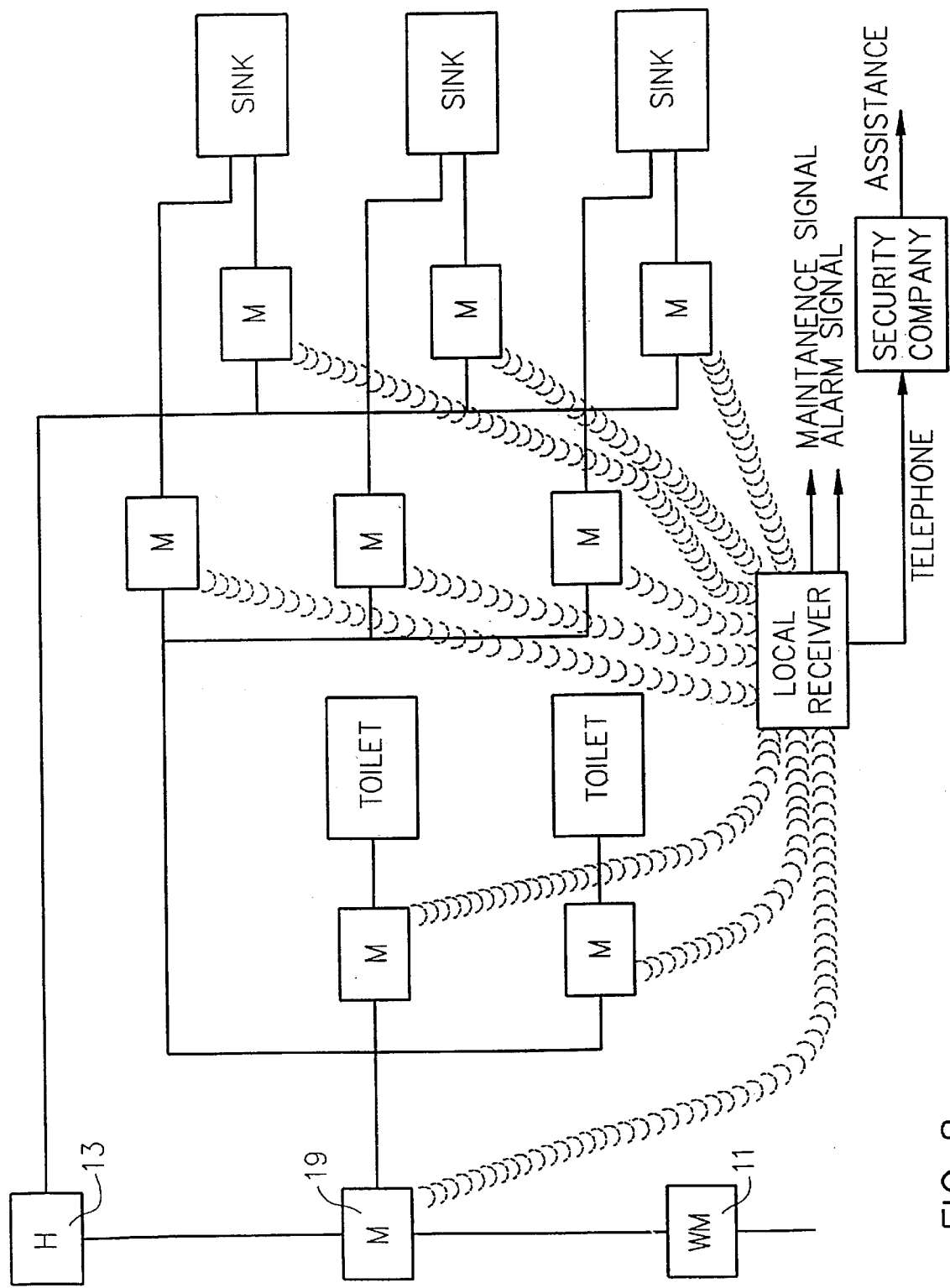
FIG. 8 is a schematic illustration for a home system.
Figure 9:
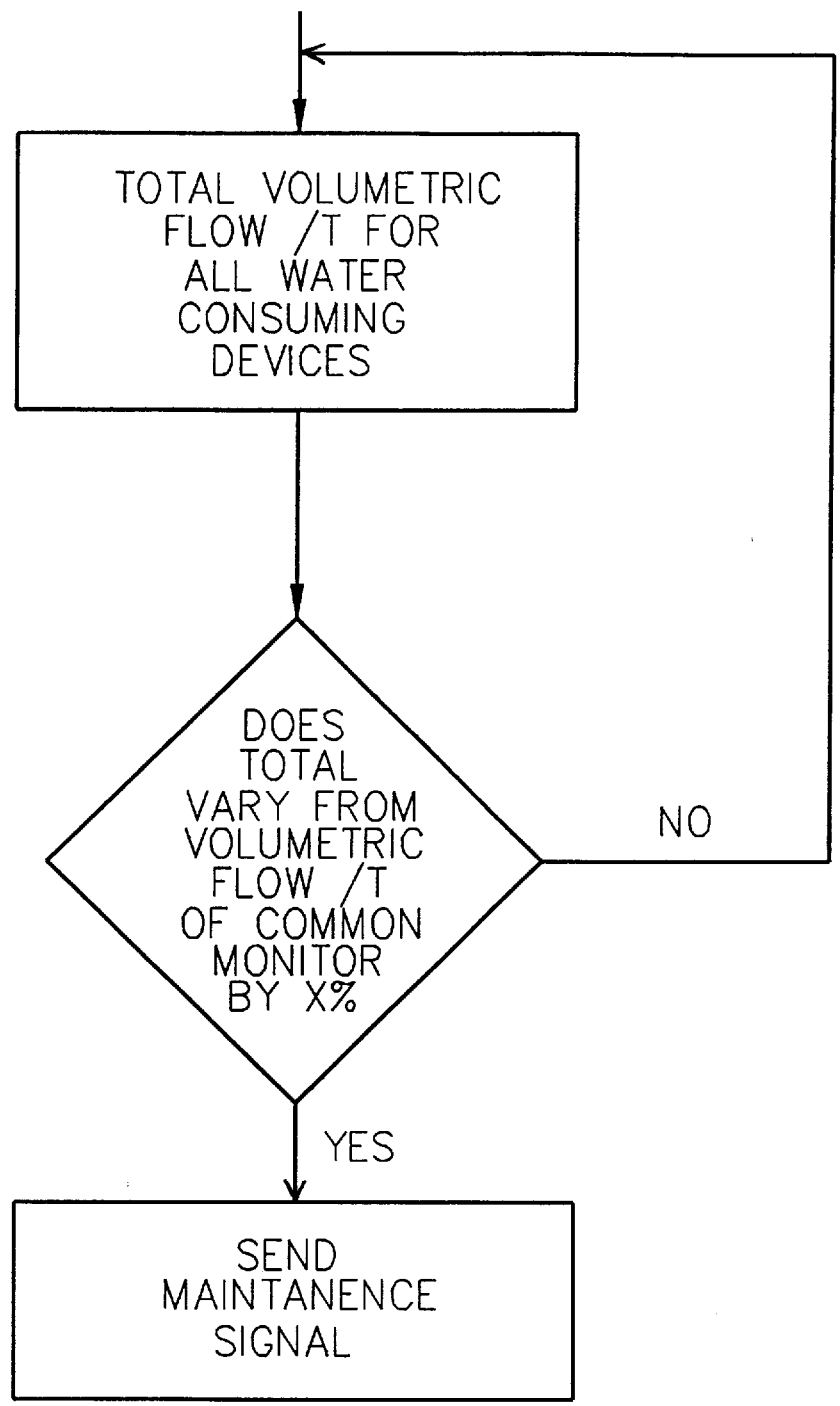
FIG. 9 is a logic diagram for comparing the output of a common monitor with the outputs of all the dedicated monitors to identify a leak.

The receiver, in its simplest form, could contain an information system (or a part of a larger information system) for an individual unit or a home (FIG. 8). A monitor which would not have to monitor temperature, could be placed in each line supplying the water consuming devices so that volumetric flow data could be transmitted to a local receiver which would determine whether any device was leaking or open and would issue an appropriate alarm or maintenance signal for that device. This figure also illustrates a monitor downstream of the water meter WM-11. This monitor can implement the algorithm of FIG. 5 to detect a break in any downstream water line such as could happen as a result of earthquake or freeze damage, for example. By comparing the volumetric flow/unit of time of this common monitor (FIG. 9), with the total/unit of time of all the dedicated monitors, an internal leak can be identified (a variance of X% would indicate an internal leak). Maintenance and alarm signals can be issued by the local receiver and optionally the local receiver can communicate with a remote receiver in the form of a security company or to the monitoring or billing system to obtain assistance.

Figure 10:
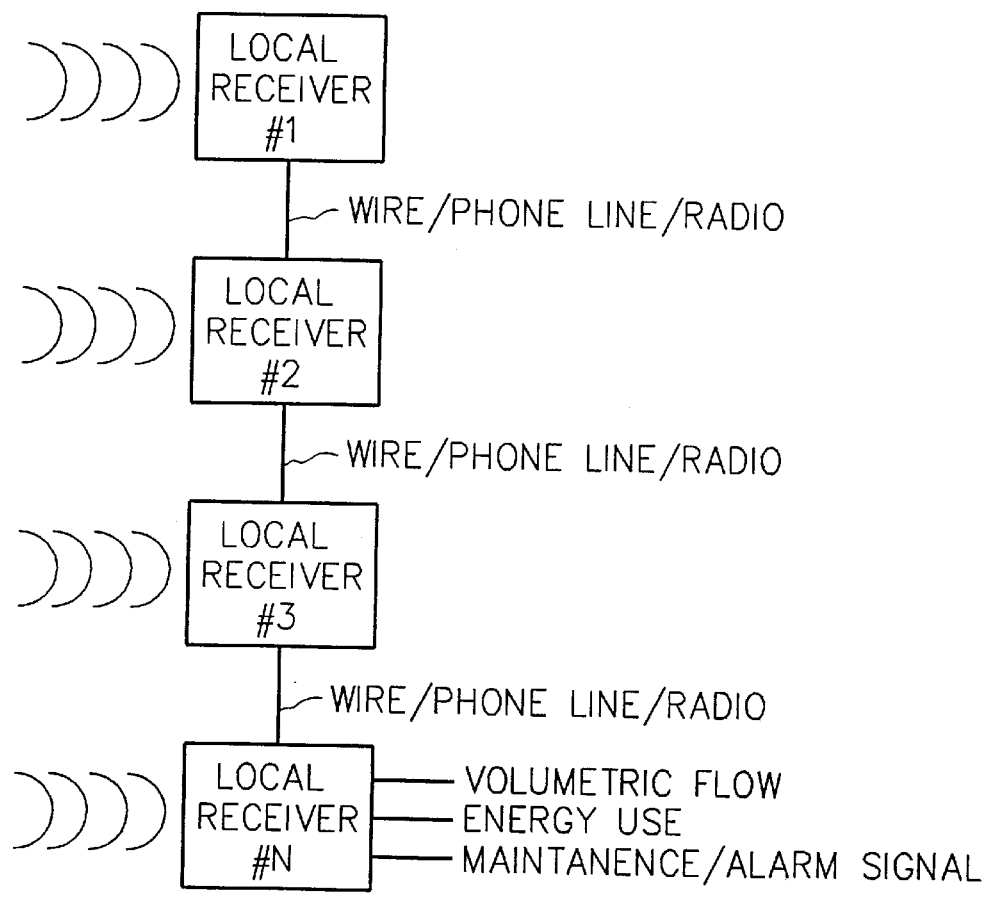
FIG. 10 is a schematic illustration of a system for a building that has a plurality of local receivers that are hard wired in series with the base local receiver outputting data.
Figure 11:
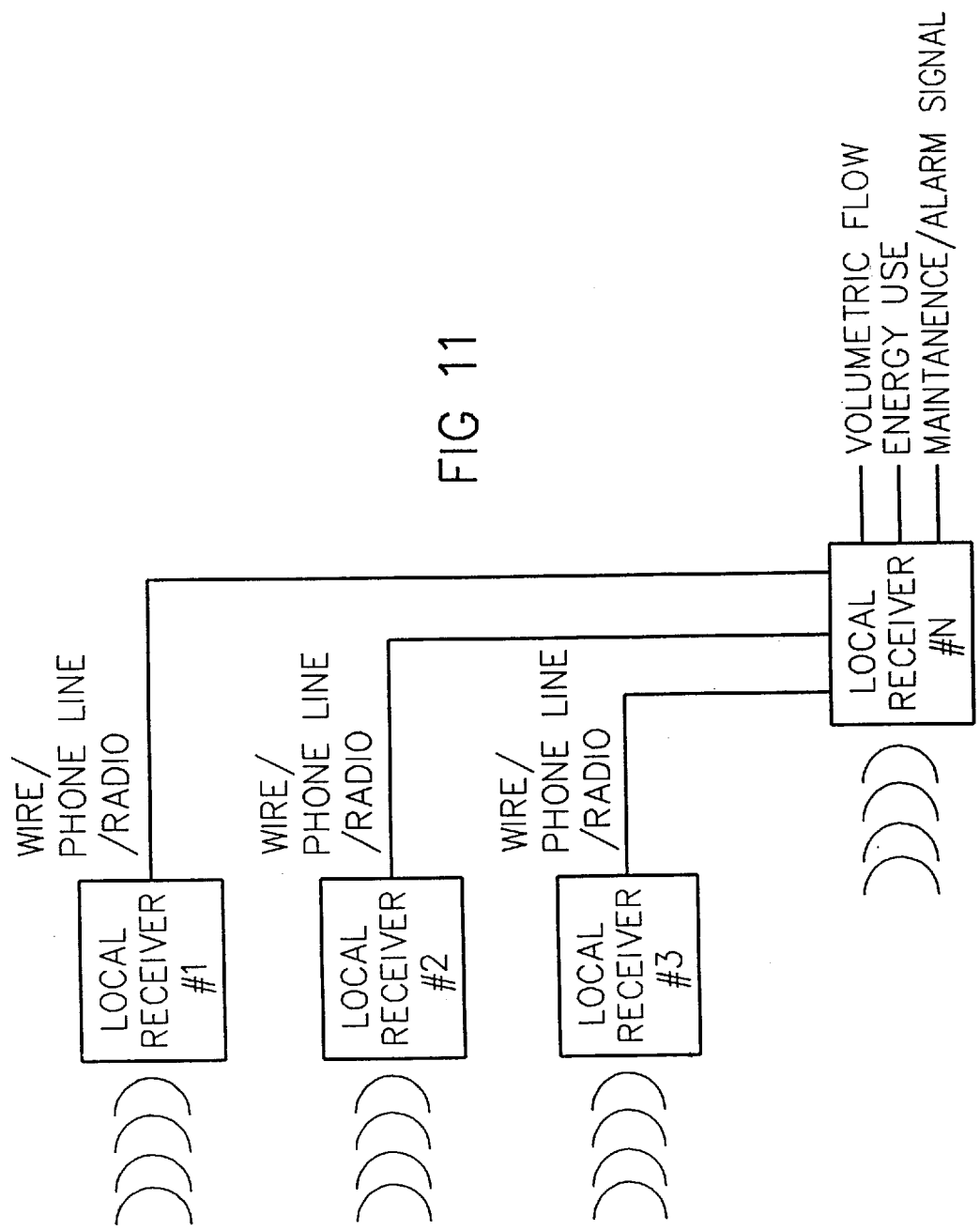
FIG. 11 is a schematic illustration of a system similar to that of FIG. 6, with individual local receivers hard wired or phone linked in parallel to a base local computer.
Figure 12:
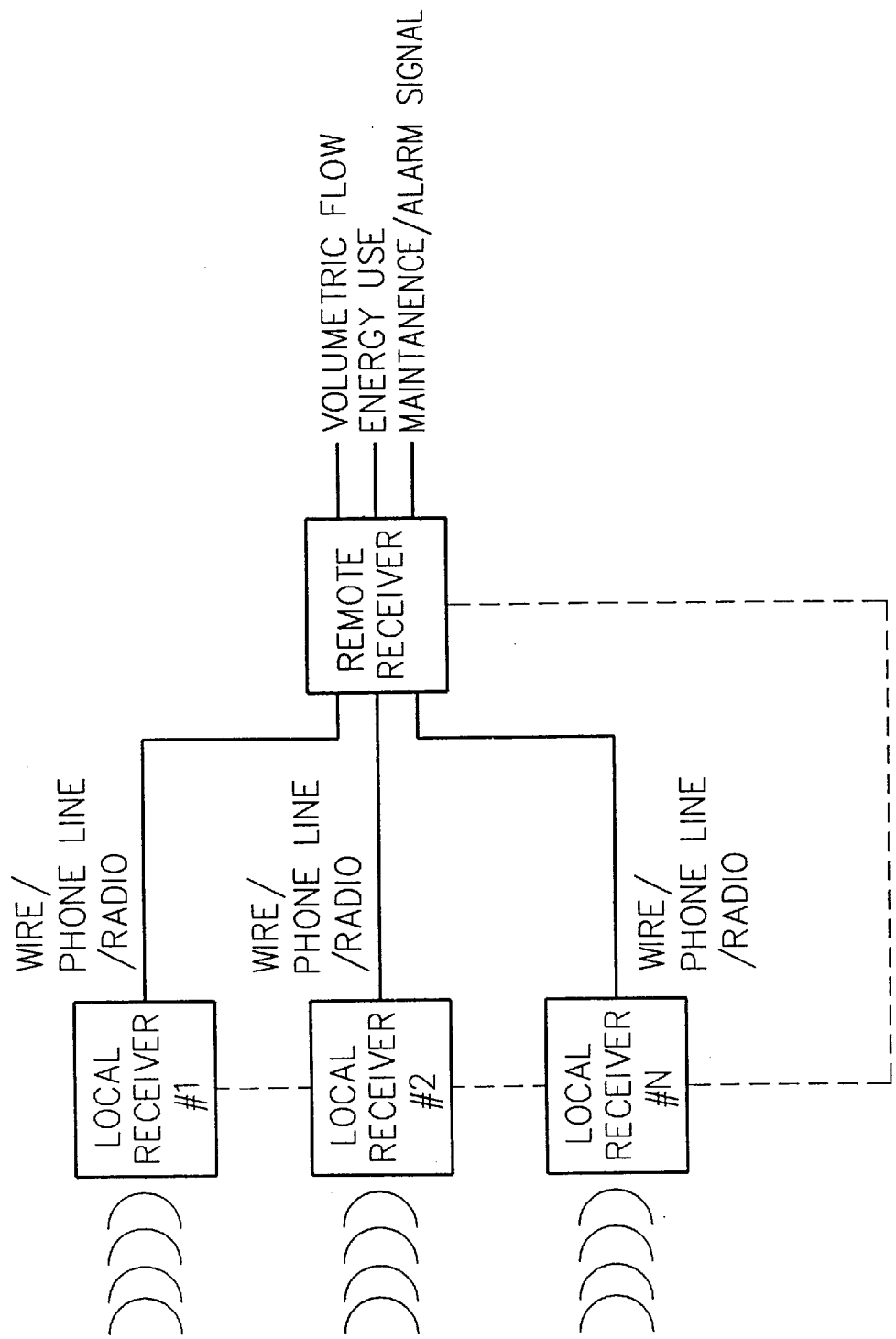
FIG. 12 is a schematic illustration of a system having a plurality of local receivers linked in series or in parallel to a remote receiver.

As shown in FIG. 10, the multi-unit building may have a plurality of local receivers hard wired in series (or connected on a phone line) to a base local receiver (the local receiver located on the superintendents' floor for example), with the base local receiver presenting the data for all the local receivers. Instead of phone lines or wires, a radio (custom or PCS system) could transmit the data from one local receiver to other local/remote receivers. The total volumetric flow and energy use for an individual unit can be computed by each of the local receivers or all computations can be performed by the base local receiver. Alternately, such a base local receiver can be connected in parallel with the other local receivers (FIG. 11). The base receiver may not receive data from a monitor but only receive data from local receivers (receivers receiving data from monitors (FIG. 12). The base receiver is then a remote receiver. The remote receiver (FIG. 13) can provide a database which communicates via phone lines with any number of local and/or remote receivers and a receiver (a local receiver, a base local receiver or a remote receiver) can operate on the data and prepare, bills for water, energy and sewer use for each reporting unit which can be sent directly to the individual units or to the buildings for distribution as well as support reporting of leaks and open faucets, etc.

What is claimed is:

1. A system for monitoring the use of heat energy in a plurality of energy consuming water devices in an individual unit of a multi-unit building wherein each energy consuming water device is supplied by a water pipe comprising
   at least one monitor for monitoring the flow through each of the plurality of water pipes, each of said monitors including
      meter means for determining that successive volumetric flow units have flowed through the pipe,
      temperature sensing means for sensing the temperature of the water flowing through the water pipe,
      multiplying means for defining the heat energy of each of said successive volumetric flow units by multiplying the temperature times the increment of flow,
      totalizator means for computing a total heat energy for said successive volumetric flow units, and
      a transmitter for periodically transmitting said total heat energy for said successive volumetric flow units, and
   a first remote receiver for receiving the total heat energy transmitted by the transmitter of each of said plurality of monitors and periodically retransmitting the total heat energy received from each of the monitors, and
   a second remote receiver for receiving the total heat energy for each of said monitors retransmitted from said first remote receiver and for periodically computing the total heat energy of the water for said Plurality of monitors.

2. A system for monitoring the use of heat energy in energy consuming water devices in an individual unit of a multi-unit building according to claim 1, wherein said plurality of energy consuming water devices includes at least one hot water consuming device which discharges hot water during use and wherein a single monitor monitors the flow through each of the hot water consuming devices that discharge hot water during use.

3. A system for monitoring the use of heat energy in energy consuming water devices in an individual unit of a multi-unit building according to claim 1, wherein said plurality of energy consuming water devices includes at least one heating/cooling device supplied by a water pipe, and wherein first and second monitors are located on either side of each of said heating/cooling devices and said second remote receiver computes a total heat energy use for each of the heating/cooling devices by subtracting the total heat energy of the first monitor monitoring the flow through the heating/cooling device from the total heat energy of the second monitor monitoring the flow through the heating/cooling device.

4. A system for monitoring the use of heat energy in energy consuming water devices in an individual unit of a multi-unit building according to claim 3, wherein said plurality of energy consuming water devices includes at least one hot water consuming device which discharges hot water during use and wherein a single monitor monitors the flow through each of the hot water consuming devices that discharge hot water during use.

5. A system for monitoring the use of heat energy in a plurality of heat energy using water devices in an individual unit of a multi-unit building wherein each water device discharges hot water supplied by a water pipe comprising
   a monitor for monitoring the flow through each of the plurality of water pipes, each of said monitors including
      meter means for determining that successive volumetric flow units have flowed through the pipe,
      temperature sensing means for sensing the temperature of the water flowing through the water pipe,
      multiplying means for defining the heat energy of each of said successive volumetric flow units by multiplying the temperature times the increment of flow,
      totalizator means for computing a total heat energy for said successive volumetric flow units, and
      a transmitter for periodically transmitting said total heat energy for said successive volumetric flow units, and
   a first remote receiver for receiving the total heat energy transmitted by the transmitter of each of said plurality of monitors and periodically retransmitting the total heat energy received from each of the monitors, and
   a second remote receiver for receiving the total heat energy for each of said monitors retransmitted from said first remote receiver and for periodically computing the total heat energy of the water for said plurality of monitors.

6. A system for monitoring the use of heat energy in a plurality of energy using water devices in an individual unit of a multi-unit building wherein each energy using water device is supplied by a water pipe comprising first and second monitors located on either side of each of said heating/cooling devices, each of said monitors including
  meter means for determining that successive volumetric flow units have flowed through the pipe,
  temperature sensing means for sensing the temperature of the water flowing through the water pipe,
  multiplying means for defining the heat energy of each of said successive volumetric flow units by multiplying the temperature times the increment of flow,
  totalizator means for computing a total heat energy for said successive volumetric flow units, and
  a transmitter for periodically transmitting said total heat energy for said successive volumetric flow units, and
a first remote receiver for receiving the total heat energy transmitted by the transmitter of each of said plurality of monitors and periodically retransmitting the total heat energy received from each of the monitors, and
a second remote receiver for receiving the total heat energy for each of said monitors retransmitted from said first remote receiver and for periodically computing the total heat energy of the water for said plurality of monitors by subtracting the total heat energy of the first monitor monitoring the flow through the heating/cooling device from the total heat energy of the second monitor monitoring the flow through the heating/cooling device.

7. A system for monitoring the use of heat energy in an energy consuming water device in an individual unit of a multi-unit building which is supplied by a water pipe comprising a monitor for monitoring the flow through the water pipe including
  meter means for determining that successive volumetric flow units have flowed through the pipe,
  temperature sensing means for sensing the temperature of the water flowing through the water pipe,
  multiplying means for defining the heat energy of each of said successive volumetric flow units by multiplying the temperature times the increment of flow,
  totalizator means for computing a total heat energy for said successive volumetric flow units, and
  a transmitter for periodically transmitting said total heat energy for said successive volumetric flow units,
a first remote receiver for receiving the total heat energy transmitted by said transmitter and periodically retransmitting the total heat energy received from said monitor, and
a second remote receiver for receiving the total heat energy for said monitor retransmitted from said first remote receiver and for periodically computing the total heat energy of the water for said monitor.

8. A system for monitoring the use of heat energy in an energy consuming water device in an individual unit of a multi-unit building according to claim 7, wherein said energy consuming water device is a hot water consuming device which discharges hot water during use.

9. A system for monitoring the use of heat energy in an energy consuming water device in an individual unit of a multi-unit building according to claim 7, wherein said energy consuming water device is a heating/cooling device.

10. A system for monitoring the use of heat energy in a heating/cooling device in an individual unit of a multi-unit building which is supplied by a water pipe comprising a monitor for monitoring the flow through the water pipe including
  meter means for determining that successive volumetric flow units have flowed through the pipe,
  temperature sensing means for sensing the temperature of the water flowing through the water pipe at first and second spaced locations, on either side of the heating/cooling device
multiplying means
  for defining the heat energy of each of said successive volumetric flow units at the first location by multiplying the temperature sensed at the first location times the increment of flow and
  for defining the heat energy of each of said successive volumetric flow units at the second location by multiplying the temperature sensed at the second location times the increment of flow,
totalizator means
  for computing a first total heat energy for said successive volumetric flow units at said first location and
  for computing a second total heat energy for said successive volumetric flow units at said second location, and
a transmitter for periodically transmitting the first and second total heat energy for said successive volumetric flow units, and
a first remote receiver for receiving the first and second total heat energy transmitted by said transmitter and periodically retransmitting the first and second total heat energy received from said monitor, and
a second remote receiver for receiving the first and second total heat energy for said monitor retransmitted from said first remote receiver and for periodically computing the total heat energy of the water consumed by the device.

* * * * *